(12) United States Patent
Taniguchi

(10) Patent No.: US 8,570,547 B2
(45) Date of Patent: Oct. 29, 2013

(54) IMAGE REGISTRATION DEVICE, IMAGE REGISTRATION SYSTEM, IMAGE REGISTRATION METHOD AND COMPUTER READABLE MEDIUM THAT REGISTER THE ASSOCIATED IMAGE ACQUIRED BY THE ASSOCIATED IMAGE ACQUISITION UNIT WITH THE ASSOCIATED IMAGE BEING ASSIGNED TO THE PREDETERMINED PROCESS

(75) Inventor: Shinichiro Taniguchi, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 251 days.

(21) Appl. No.: 12/728,553

(22) Filed: Mar. 22, 2010

(65) Prior Publication Data

US 2011/0007336 A1 Jan. 13, 2011

(30) Foreign Application Priority Data

Jul. 10, 2009 (JP) .................................. 2009-164200

(51) Int. Cl.
| G06K 15/00 | (2006.01) |
| G06F 3/12 | (2006.01) |
| G06F 17/00 | (2006.01) |
| G06F 7/04 | (2006.01) |
| H04N 1/40 | (2006.01) |
| H04N 7/16 | (2011.01) |

(52) U.S. Cl.
USPC ....... 358/1.14; 358/1.15; 358/1.16; 358/3.28; 726/1; 726/4; 726/7; 726/27

(58) Field of Classification Search
USPC ........... 358/1.14, 100, 3.28, 1.1, 1.6, 1.4, 1.9, 358/1.15, 1.16, 1.18, 505, 539, 403, 444, 358/448, 474, 426.12, 3.31; 382/305, 116, 382/130, 140, 175, 181, 189, 190; 726/1, 7, 726/4, 6, 3, 14, 21, 27, 28, 29, 33, 35

See application file for complete search history.

(56) References Cited

U.S. PATENT DOCUMENTS

| 5,583,941 A | 12/1996 | Yoshida et al. |
| 2007/0174896 A1* | 7/2007 | Furuya et al. ..................... 726/1 |
| 2008/0050037 A1 | 2/2008 | Sakiyama et al. |
| 2008/0174790 A1* | 7/2008 | Noguchi et al. ............... 358/1.1 |
| 2008/0218806 A1* | 9/2008 | Yokokura .................... 358/3.28 |
| 2009/0037980 A1 | 2/2009 | Kubo |
| 2009/0161994 A1* | 6/2009 | Sauerwein et al. ........... 382/313 |
| 2009/0271839 A1* | 10/2009 | Kanai et al. ...................... 726/1 |

FOREIGN PATENT DOCUMENTS

| JP | 07-056484 A | 3/1995 |
| JP | 07-115552 A | 5/1995 |
| JP | 2002-041398 A | 2/2002 |
| JP | 2003-263084 A | 9/2003 |
| JP | 2007-199909 A | 8/2007 |
| JP | 2008-053930 A | 3/2008 |
| JP | 2009-033228 A | 2/2009 |

OTHER PUBLICATIONS

Japanese Office Action (Notification of Reasons for Refusal) dated Aug. 6, 2013, for Japanese Patent Application 2009-164200.

* cited by examiner

*Primary Examiner* — Ngon Nguyen
(74) *Attorney, Agent, or Firm* — Sughrue Mion, PLLC

(57) ABSTRACT

An image registration device includes: an associated image acquisition unit that acquires an associated image associated with a document image read from a medium on which the document image is formed, a predetermined process being to be performed on the document image; and a registration unit that registers the associated image acquired by the associated image acquisition unit with the associated image being assigned to the predetermined process.

16 Claims, 18 Drawing Sheets

FIG.4

| STAMP ID | STAMP IMAGE | STAMP CHARACTER DATA |
|---|---|---|
| 0001 | TOP SECRET | STAMP CHARACTER DATA OF STAMP 0001 |

FIG.5

| POLICY ID | RIGHT | RANGE OF DISCLOSURE | DUE TIME | STAMP ID |
|---|---|---|---|---|
| 0001 | BROWSING ONLY | INSIDE COMPANY | ONE YEAR AFTER ISSUE | |
| 0002 | BROWSING ONLY | INSIDE DEPARTMENT | THREE YEARS AFTER ISSUE | 0001 |

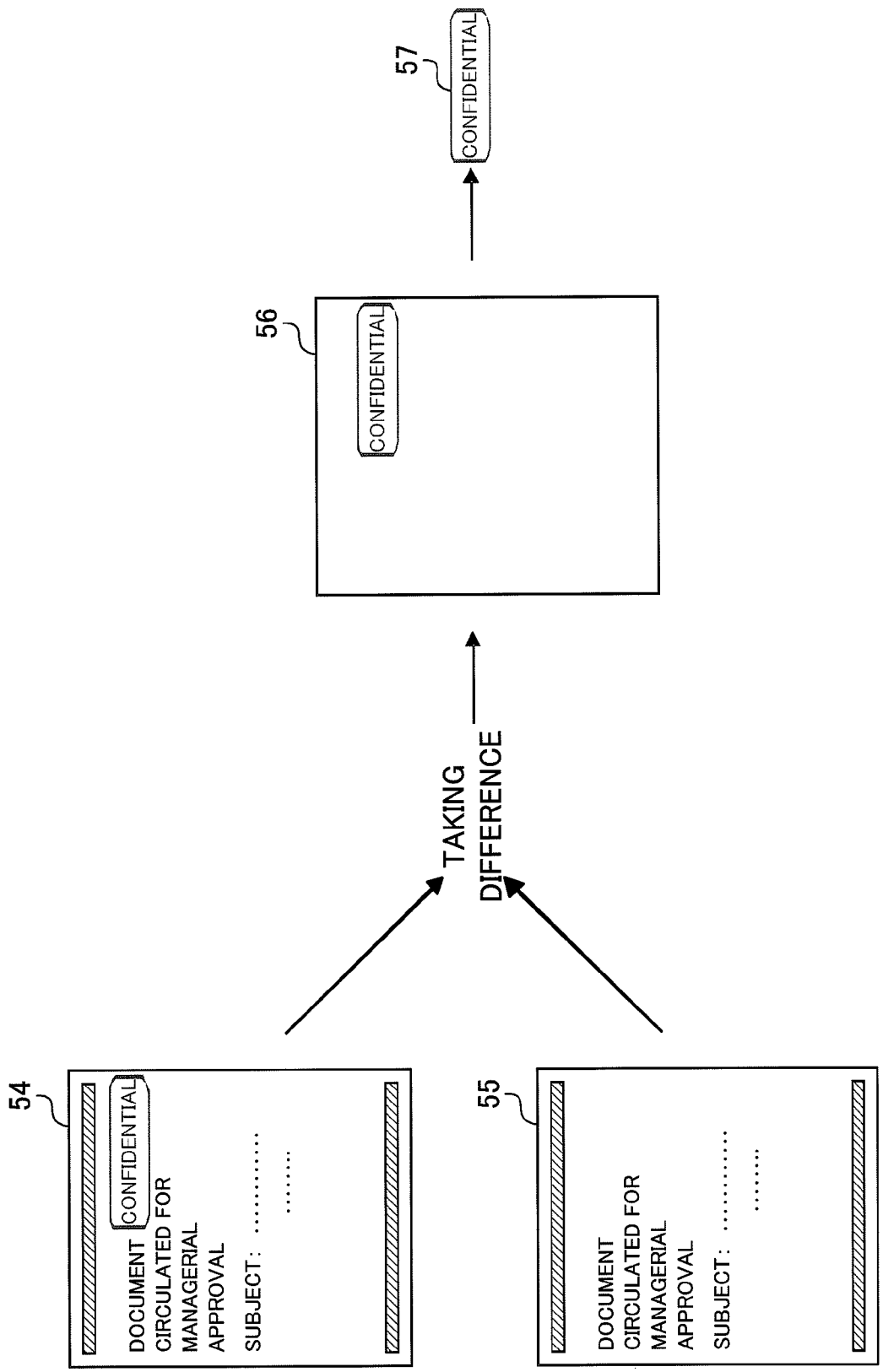

FIG.13A

| STAMP ID | STAMP IMAGE | STAMP CHARACTER DATA |
|---|---|---|
| 0001 | TOP SECRET | STAMP CHARACTER DATA OF STAMP 0001 |
| 0002 | CONFIDENTIAL | STAMP CHARACTER DATA OF STAMP 0002 |

FIG.13B

| POLICY ID | RIGHT | RANGE OF DISCLOSURE | DUE TIME | STAMP ID |
|---|---|---|---|---|
| 0001 | BROWSING ONLY | INSIDE COMPANY | ONE YEAR AFTER ISSUE | 0002 |
| 0002 | BROWSING ONLY | INSIDE DEPARTMENT | THREE YEARS AFTER ISSUE | 0001 |

FIG.14A

| STAMP ID | STAMP IMAGE | STAMP CHARACTER DATA | POLICY ID |
|---|---|---|---|
| 0001 | TOP SECRET | STAMP CHARACTER DATA OF STAMP 0001 | 0002 |

FIG.14B

| POLICY ID | RIGHT | RANGE OF DISCLOSURE | DUE TIME |
|---|---|---|---|
| 0001 | BROWSING ONLY | INSIDE COMPANY | ONE YEAR AFTER ISSUE |
| 0002 | BROWSING ONLY | INSIDE DEPARTMENT | THREE YEARS AFTER ISSUE |

FIG.15

| STAMP ID | STAMP IMAGE | STAMP CHARACTER DATA | POLICY ID |
|---|---|---|---|
| 0001 | TOP SECRET | STAMP CHARACTER DATA OF STAMP 0001 | 0002 |
| 0002 | CONFIDENTIAL | STAMP CHARACTER DATA OF STAMP 0002 | 0001 |

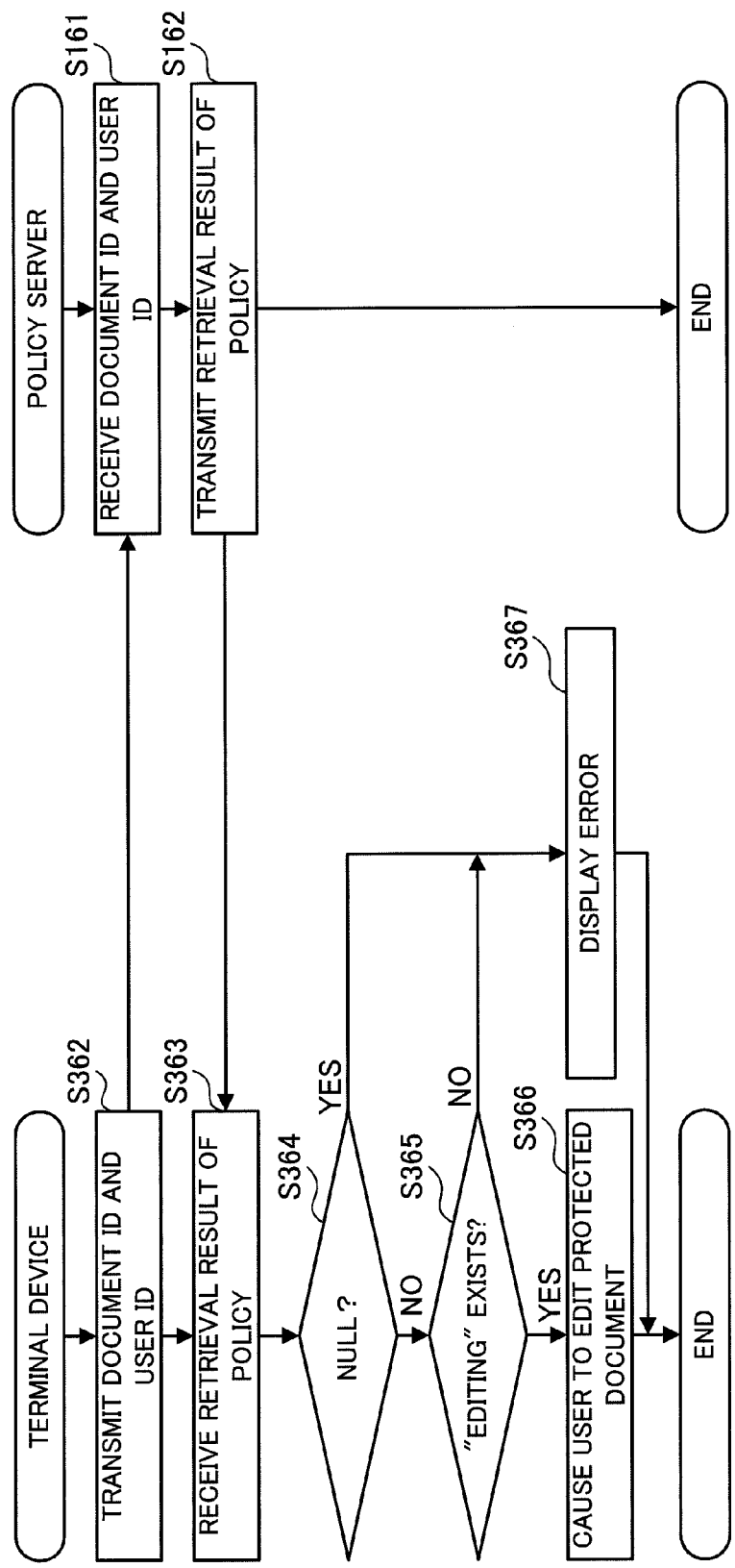

IMAGE REGISTRATION DEVICE, IMAGE REGISTRATION SYSTEM, IMAGE REGISTRATION METHOD AND COMPUTER READABLE MEDIUM THAT REGISTER THE ASSOCIATED IMAGE ACQUIRED BY THE ASSOCIATED IMAGE ACQUISITION UNIT WITH THE ASSOCIATED IMAGE BEING ASSIGNED TO THE PREDETERMINED PROCESS

CROSS REFERENCE TO RELATED APPLICATIONS

This application is based on and claims priority under 35 USC §119 from Japanese Patent Application No. 2009-164200 filed Jul. 10, 2009.

BACKGROUND

1. Technical Field

The present invention relates to an image registration device, an image registration system, an image registration method and a computer readable medium.

2. Related Art

There is known an image processing apparatus that effectively prevents confidential documents from flowing out in an unauthorized way. There is also known a digital copy machine that is able to prevent falsification of ordinary documents. There is also known a technique for simplifying an operation in which a new security policy is assigned to a paper document or an electronic document.

SUMMARY

According to an aspect of the present invention, there is provided an image registration device including: an associated image acquisition unit that acquires an associated image associated with a document image read from a medium on which the document image is formed, a predetermined process being to be performed on the document image; and a registration unit that registers the associated image acquired by the associated image acquisition unit with the associated image being assigned to the predetermined process.

BRIEF DESCRIPTION OF THE DRAWINGS

Exemplary embodiment(s) of the present invention will be described in detail based on the following figures, wherein:

FIG. 4 is a table showing an example of information stored in the stamp DB;

FIG. 5 is a table showing an example of information stored in the policy DB;

FIG. 12 is a diagram showing an example of the extraction method of a stamp image;

FIGS. 13A and 13B are tables showing an example of information in the stamp DB and the policy DB after the stamp registration;

FIGS. 14A and 14B are tables showing another example of information in the stamp DB and the policy DB;

FIG. 15 is a table showing another example of information in the stamp DB after the stamp registration;

FIG. 18 is a sequence diagram showing an operation example of the computer system when a document is edited.

DETAILED DESCRIPTION

An exemplary embodiment of the present invention will be described below in detail with reference to the accompanying drawings.

<Entire Configuration of Computer System>

Figure 1:
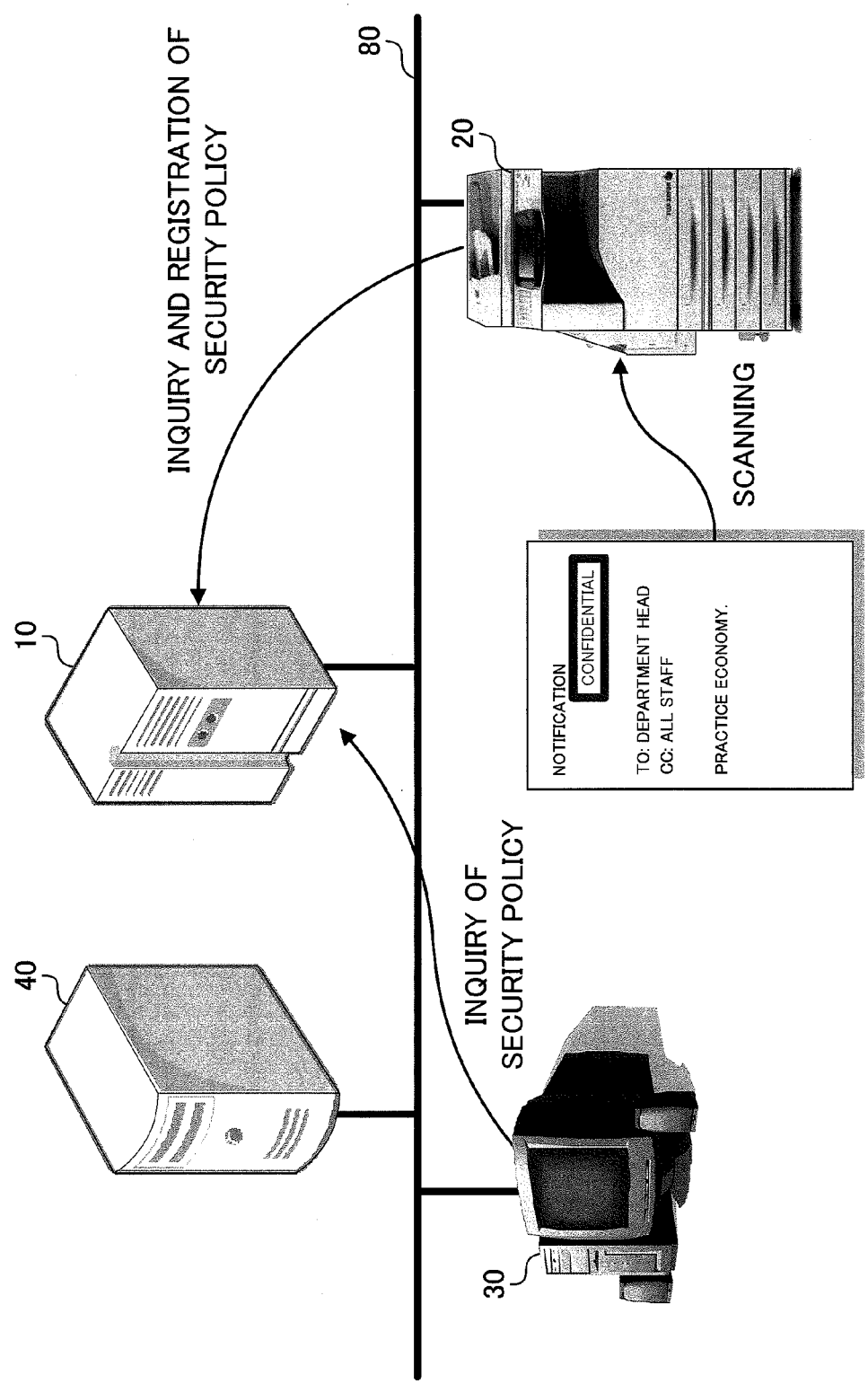
FIG. 1 is a diagram showing an entire configuration of a computer system to which the exemplary embodiment of the present invention is applied.

FIG. 1 is a diagram showing a configuration example of a computer system according to the present exemplary embodiment.

As shown in FIG. 1, the computer system is configured with a security policy server (hereinafter, referred to as "policy server") 10, an image processing apparatus 20, a terminal device 30 and an authentication server 40 connected to a network 80.

The policy server 10 is a server computer that manages security policies for protected documents. Specifically, the management of security policies is conducted by managing stamps with a stamp database (hereinafter, referred to as "stamp DB"), managing security policies assigned to the stamps with a security policy database (hereinafter, referred to as "policy DB"), and managing protected documents to which the security policies are assigned with a document information database (hereinafter, referred to as "document information DB"). As the policy server 10, for example, a computer such as a personal computer, a work station or the like may be used. In the present exemplary embodiment, the policy server 10 is provided as an example of an image registration device and a management device.

Note that the protected document refers to a document to which a security policy is assigned and whose operation is restricted. The protected document is associated with a specific security policy in the policy server 10, and is managed by being assigned a document ID to uniquely identify the protected document. Moreover, the protected document includes: a header that shows the document is a protected document; the document ID; and a protected document body that is encrypted. Among these, the header is a predetermined byte string having a specific length. In the present exemplary embodiment, it is supposed that the protected documents are encrypted with a cipher key common to all the protected documents. However, this is only an example, and different cipher keys may be used for each protected document, like the Digital Rights Management (DRM) technology. Also, the whole protected document may be assigned an electronic signature or a value such as Keyed-Hashing for Message Authentication Code (HMAC) in order to prevent the document ID of a protected document from being replaced with that of another protected document. In any case, in this system, there is no restriction except that every protected document is identified with an identifier and assigned a security policy.

The security policy is information that defines an access right to such a protected document. That is, the security policy is use restriction information to define use restriction of the protected document.

The image processing apparatus 20 reads an image of a stamped paper document, extracts a stamp image from the read image and communicates with the policy server 10 to execute a predetermined process. The image processing apparatus 20 also executes an application for a user to register a stamp. In the present exemplary embodiment, the image processing apparatus 20 is provided as an example of the image registration device and an image reading apparatus.

The terminal device 30 communicates with the policy server 10 to execute a document processing application program (hereinafter, referred to as "document processing AP") that performs processes such as browsing and editing of a protected document within a range which the security policy permits. As the terminal device 30, for example, a computer such as a personal computer, a work station or the like may be used.

The authentication server 40 is a server computer that manages user authentication, and performs a process in response to an inquiry from another device requiring the user authentication. As the authentication server 40, for example, a computer such as a personal computer, a work station or the like may be used. In particular, a Lightweight Directory Access Protocol (LDAP) server, an Active Directory server or the like may be used.

Note that, in the present exemplary embodiment, the computer system of FIG. 1 is provided as an example of an image registration system including the image reading apparatus and the management device.

<Configuration of Policy Server>

Figure 2:
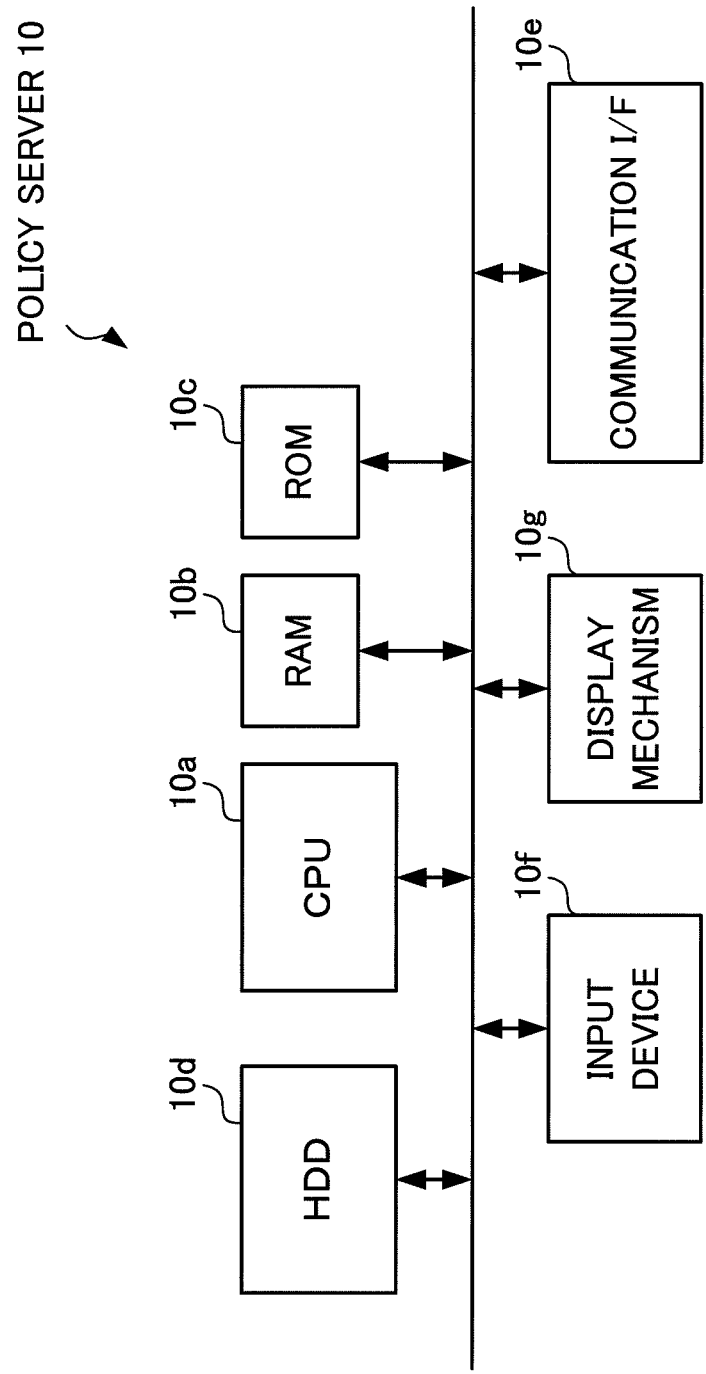
FIG. 2 is a block diagram showing an example of the hardware configuration of the policy server.

FIG. 2 is a diagram showing an example of the hardware configuration of the policy server 10.

As shown in FIG. 2, the policy server 10 includes a central processing unit (CPU) 10*a*, a random access memory (RAM) 10*b*, a read only memory (ROM) 10*c*, a hard disk drive (HDD) 10*d*, a communication interface (hereinafter, denoted as "communication I/F") 10*e*, an input device 10*f* and a display mechanism 10*g*.

The CPU 10*a* loads various programs stored in the ROM 10*c* and the like into the RAM 10*b*, and then executes the programs, thereby to implement functions to be described later.

The RAM 10*b* is a memory that is used as a working memory or the like for the CPU 10*a*.

The ROM 10*c* is a memory that stores, therein, the various programs executed by the CPU 10*a*.

The HDD 10*d* is, for example, a magnetic disk device that stores, therein, input data for the various programs executed by the CPU 10*a*, output data from the various programs, and the like.

The communication I/F 10*e* transmits and receives various types of information to and from other devices via a communication unit.

The input device 10*f* is a device used for inputting data, and is a keyboard or a mouse, for example.

The display mechanism 10*g* is a mechanism for displaying information obtained by executing the various programs, and includes a video memory and a display, for example.

Figure 3:
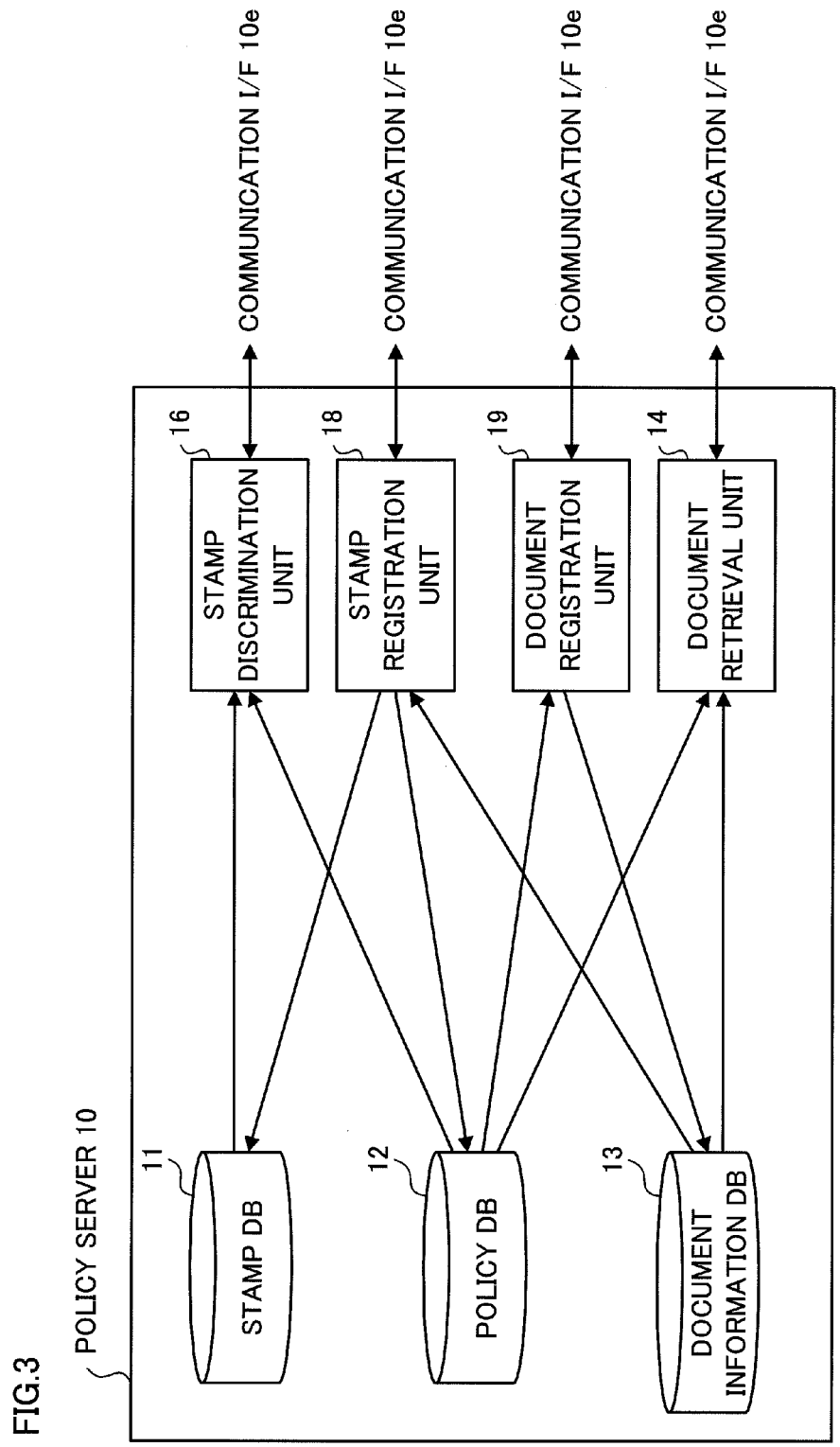
FIG. 3 is a block diagram showing an example of the functional configuration of the policy server.

FIG. 3 is a block diagram showing an example of the functional configuration of the policy server 10.

As shown in FIG. 3, the policy server 10 holds a stamp DB 11, a policy DB 12 and a document information DB 13.

FIG. 4 shows an example of stamp information stored in the stamp DB 11.

As shown in FIG. 4, the stamp information includes a stamp ID, a stamp image and stamp character data. The stamp ID is information for uniquely identifying the stamp. The stamp image is image data of the stamp. Color information is also included in this image data. In FIG. 4, gray represents vermilion, since a stamp is generally made by use of a vermilion ink pad. The stamp character data is character data obtained by processing a stamp image. Although character data are different depending on the used algorithm, any algorithm may be used.

FIG. 5 shows an example of policy information stored in the policy DB 12.

As shown in FIG. 5, the policy information includes a policy ID, a right, a range of disclosure, a due time and a stamp ID. The policy ID is information for uniquely identifying the security policy. The right is an operation permitted under the corresponding security policy. The range of disclosure is a range of users to whom the corresponding right is given. The due time is an expiration time for the corresponding right. The stamp ID is a stamp ID of a stamp to which the corresponding security policy is assigned.

Figure 6:
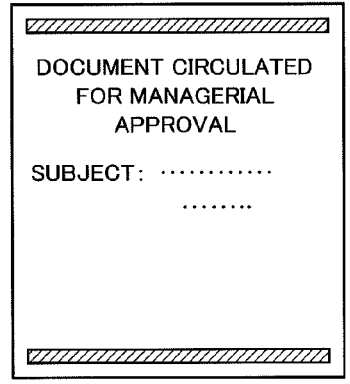
FIG. 6 is a table showing an example of information stored in the document information DB.

FIG. 6 shows an example of document information stored in the document information DB 13.

As shown in FIG. 6, the document information includes a document ID, a policy ID, a creator ID and a protected document. The document ID is information for uniquely identifying the protected document. The policy ID is information for uniquely identifying the security policy assigned to the protected document. The creator ID is information for uniquely identifying the user (creator) who has made the protected document. The protected document is document data protected under the security policy, as described above. The protected document may, however, be replaced with information used for obtaining the protected document, like information where the protected document is stored.

Note that such a policy DB 12 and a document information DB 13 may be implemented by use of an existing technique, and are not limited to the configuration as in this example. That is, any configuration may be employed as long as security policies are assigned for each protected document.

With reference to FIG. 3, again, the policy server 10 includes a document retrieval unit 14, a stamp discrimination unit 16, a stamp registration unit 18 and a document registration unit 19, as functional units that provide functions for an external device. Hereinafter, these functional units will be described.

The document retrieval unit 14 retrieves the policy information for a protected document to which a security policy has been already set, in response to an inquiry from an external device. At this time, the external device specifies the document ID of the protected document intended to inquire and the user ID of the user who makes the inquiry. The document retrieval unit 14 then returns the policy information, for example. The document retrieval unit 14 also has a function that returns the protected document, in response to an inquiry from the external device that specifies the document ID. In the present exemplary embodiment, the document retrieval unit 14 is provided as an example of a first data acquisition unit that acquires first data being a source of a document image.

The stamp discrimination unit 16 discriminates the stamp having a stamp image from the stamp DB 11, in response to an inquiry from an external device that specifies the stamp image. The stamp discrimination unit 16 then takes the policy ID of the security policy assigned to the discriminated stamp out of the policy DB 12, and returns the policy ID.

The stamp registration unit 18 registers the stamp information of a stamp intended to discriminate, in the stamp DB 11. That is, upon being called by an external device with a document ID and a stamp image specified, the stamp registration unit 18 refers to the document information DB 13 to acquire the policy ID. The stamp registration unit 18 then registers the stamp information in the stamp DB 11, and associates the stamp information with this policy ID in the policy DB 12. At this time, user authentication may be performed first, thereby to permit only predetermined users the registration, in order to limit users who are able to register a stamp. Also, multiple stamp images may be specified, so that all of these stamp images are subjected to the above process. In the present exemplary embodiment, the stamp registration unit 18 is provided as an example of an associated image acquisition unit that acquires an associated image and a registration unit that registers the associated image with the associated image being assigned to a process.

The document registration unit 19 registers document information to define that a document is protected under the specified security policy. That is, upon being called by an external device with a user ID, a policy ID and a protected document specified, the document registration unit 19 registers the document information including the above information and the document ID in the document information DB 13.

<Configuration of Image Processing Apparatus>

Figure 7:
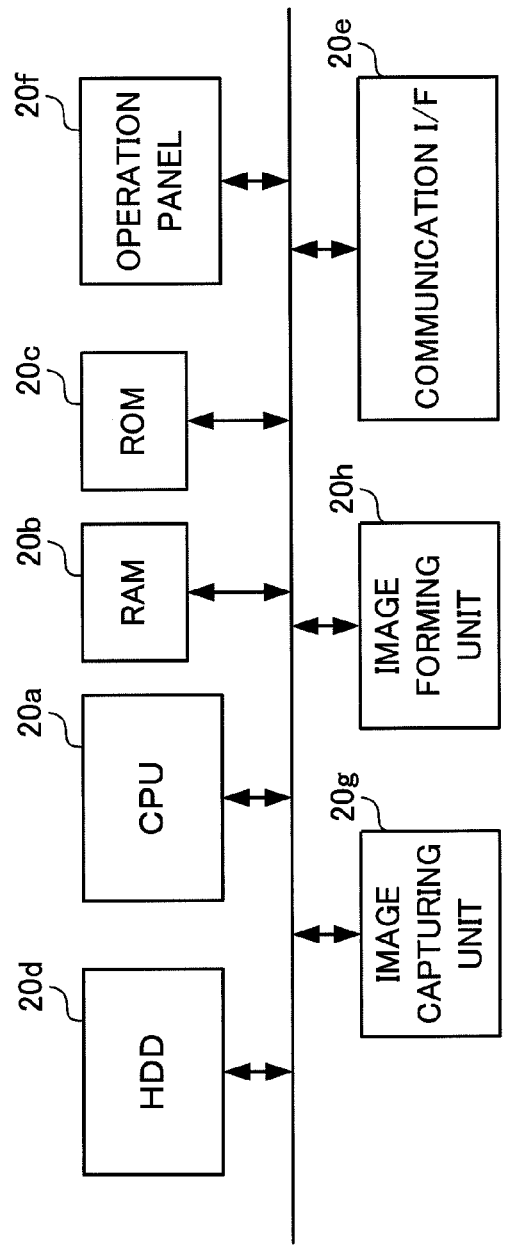
FIG. 7 is a block diagram showing an example of the hardware configuration of the image processing apparatus.

FIG. 7 is a diagram showing an example of the hardware configuration of the image processing apparatus 20.

As shown in FIG. 7, the image processing apparatus 20 includes a central processing unit (CPU) 20a, a random access memory (RAM) 20b, a read only memory (ROM) 20c, a hard disk drive (HDD) 20d, a communication interface (hereinafter, denoted to as "communication I/F") 20e, an operation panel 20f, an image capturing unit 20g and an image forming unit 20h.

The CPU 20a loads various programs stored in the ROM 20c and the like into the RAM 20b, and then executes the programs, thereby to implement functions to be described later.

The RAM 20b is a memory that is used as a working memory or the like for the CPU 20a.

The ROM 20c is a memory that stores, therein, the various programs executed by the CPU 20a.

The HDD 20d is, for example, a magnetic disk device that stores, therein, image data captured by the image capturing unit 20g, image data used for image formation in the image forming unit 20h, and the like.

The communication I/F 20e transmits and receives various types of information to and from other devices via a communication unit.

The operation panel 20f is, for example, a touch panel that displays various types of information and that receives an operation input by a user.

The image capturing unit 20g captures an image recorded on a recording medium such as paper. The image capturing unit 20g herein is, for example, a scanner. The image capturing unit 20g may employ one of the following two systems: a charge coupled device (CCD) system in which reflected light of light beams emitted from a light source to an original document is reduced by use of a lens and is then received by a CCD; and a contact image sensor (CIS) system in which reflected light of light beams sequentially emitted from LED light sources to an original document is received by a CIS. In the present exemplary embodiment, the image capturing unit 20g is provided as an example of a reading unit that reads an image from a medium.

The image forming unit 20h forms an image on a recording medium such as paper. The image forming unit 20h herein is, for example, a printer. The image forming unit 20h may employ one of the following two methods: an electrophotographic method in which an image is formed by transferring toner attached to a photoconductive drum onto a recording medium; and an ink jet method in which an image is formed by ejecting ink onto a recording medium.

Figure 8:
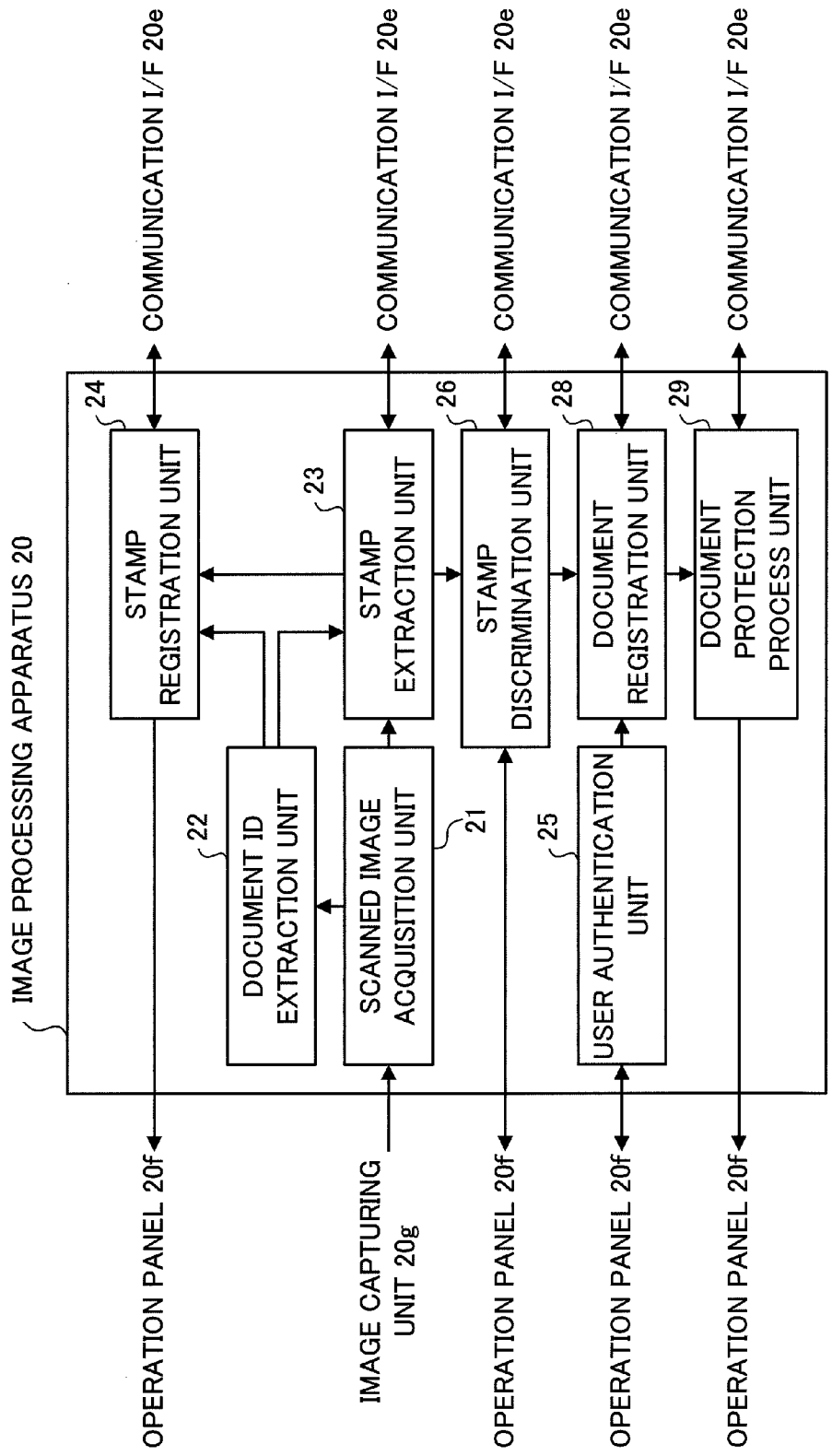
FIG. 8 is a block diagram showing an example of the functional configuration of the image processing apparatus.

FIG. 8 is a block diagram showing an example of the functional configuration of the image processing apparatus 20.

As shown in FIG. 8, the image processing apparatus 20 includes a scanned image acquisition unit 21, a document ID extraction unit 22, a stamp extraction unit 23 and a stamp registration unit 24. The image processing apparatus 20 also includes a user authentication unit 25, a stamp discrimination unit 26, a document registration unit 28 and a document protection process unit 29. Hereinafter, these functional units will be described. The following stamp registration and document registration will be described later in detail.

The scanned image acquisition unit 21 operates on the occasion of the stamp registration and the document registration. The scanned image acquisition unit 21 acquires a scanned image obtained by image capturing which the image capturing unit 20g performs. In the present exemplary embodiment, the scanned image acquisition unit 21 is provided as an example of a second data acquisition unit that acquires second data obtained by computerizing an image read from a medium.

The document ID extraction unit 22 operates on the occasion of the stamp registration. The document ID extraction unit 22 extracts a document ID from the scanned image acquired by the scanned image acquisition unit 21, and passes the document ID to the stamp extraction unit 23 and the stamp registration unit 24.

The stamp extraction unit 23 operates on the occasion of the stamp registration and the document registration. The stamp extraction unit 23 extracts a stamp ID from the scanned image acquired by the scanned image acquisition unit 21, and passes the stamp ID to the stamp registration unit 24. On the occasion of the stamp registration, the extraction of a stamp herein may be performed with a method of taking the difference between a document that is stamped and read and a document that is registered and does not have a stamp. The method will be described later. Also, on the occasion of the document registration, the extraction of a stamp may be performed by use of an existing technique, such as cutting out a section of a specific shape from the scanned image. The stamp extraction unit 23 is provided as an example of an acquisition unit that acquires an associated image.

The stamp registration unit 24 operates on the occasion of the stamp registration. The stamp registration unit 24 specifies the document ID passed from the document ID extraction unit 22 and the stamp image passed from the stamp extraction unit 23, to call the stamp registration unit 18 of the policy server 10. Thereby, in the policy server 10, the stamp image is registered in connection with the policy ID. In the present exemplary embodiment, the stamp registration unit 24 is provided as an example of the registration unit that registers an associated image with the associated image being assigned to a process.

The user authentication unit 25 communicates with the authentication server 40 to perform user authentication, on the basis of a user ID, a password and the like inputted via the operation panel 20f. When the user authentication is succeeded, the user authentication unit 25 holds the user ID and passes the user ID to the document registration unit 28.

The stamp discrimination unit 26 specifies the stamp image passed from the stamp extraction unit 23, to call the stamp discrimination unit 16 of the policy server 10. When acquiring a policy ID, the stamp discrimination unit 26 passes the policy ID to the document registration unit 28.

The document registration unit 28 specifies the user ID passed from the user authentication unit 25 and the policy ID passed from the stamp discrimination unit 26, to call the document registration unit 19 of the policy server 10. The document registration unit 28 then acquires the document ID with respect to the document data generated from a scanned image, and passes the document ID to the document protection process unit 29.

The document protection process unit 29 assigns a document ID to the document data generated from a scanned image. The document protection process unit 29 encrypts the document data body to generate a protected document, and stores the protected document.

<Configuration of Terminal Device>

The hardware configuration of the terminal device 30 is similar to that shown in FIG. 2. However, the CPU 10a, the RAM 10b, the ROM 10c, the HDD 10d, the communication I/F 10e, the input device 10f and the display mechanism 10g are read as the CPU 30a, the RAM 30b, the ROM 30c, the HDD 30d, the communication I/F 30e, the input device 30f and the display mechanism 30g, respectively.

Figure 9:
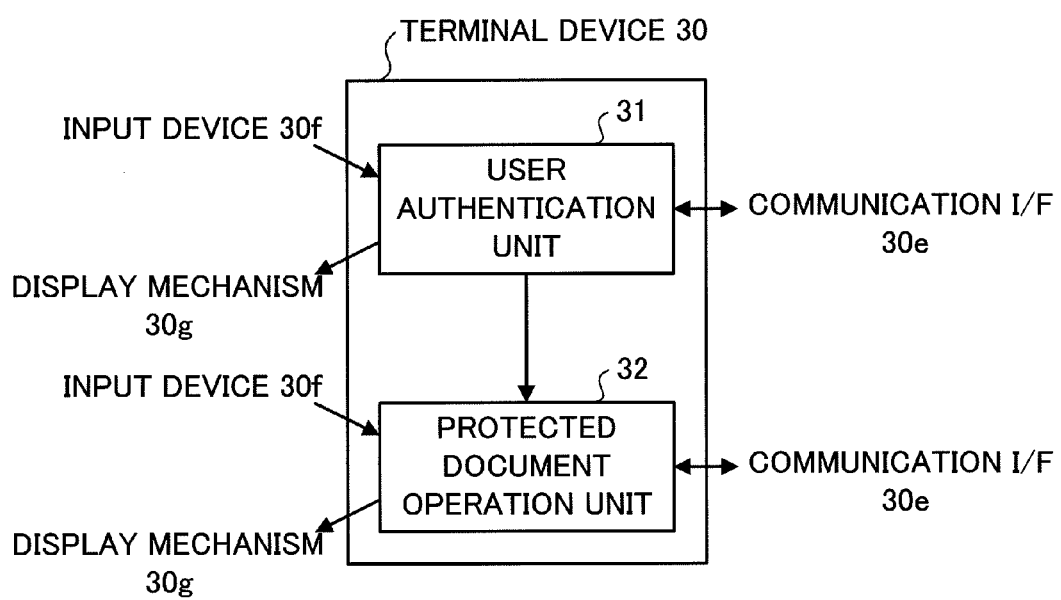
FIG. 9 is a block diagram showing an example of the functional configuration of the terminal device.

FIG. 9 is a diagram showing an example of the functional configuration of the terminal device 30.

As shown in FIG. 9, the terminal device 30 includes a user authentication unit 31 and a protected document operation unit 32. In a terminal device 30 used by a general user, there operates a document processing AP that, for example, edits and prints out a protected document within a range permitted under the security policy. The above functional units are implemented by an operation of the document processing AP. Hereinafter, these functional units will be described.

The user authentication unit 31 communicates with the authentication server 40 to perform user authentication, on the basis of a user ID, a password and the like inputted via the input device 30f. When the user authentication is succeeded, the user authentication unit 31 holds the user ID and passes the user ID to the protected document operation unit 32.

The protected document operation unit 32 communicates with the policy server 10 according to a request inputted via the input device 30f. The protected document operation unit 32 performs an operation of a protected document that is, for example, browsing, editing, printing out, or the like.

<Configuration of Authentication Server>

The hardware configuration of the authentication server 40 is also similar to that shown in FIG. 2. However, the CPU 10a, the RAM 10b, the ROM 10c, the HDD 10d, the communication I/F 10e, the input device 10f and the display mechanism 10g are read as the CPU 40a, the RAM 40b, the ROM 40c, the HDD 40d, the communication I/F 40e, the input device 40f and the display mechanism 40g, respectively.

Although not shown, the functional configuration of the authentication server 40 has only to include at least: a database that manages correspondence between a user ID, a password and the like; and a function that returns authentication success if correspondence between the user ID, the password and the like received from an external device is managed in this database, and that returns authentication failure if not.

<Operations of Present Exemplary Embodiment>

Next, operations of the present exemplary embodiment will be described.

Operations of the present exemplary embodiment include: a process (hereinafter, referred to as "stamp registration process") in which a stamp is assigned to a security policy and registered, by use of the image processing apparatus 20; a process (hereinafter, referred to as "document registration process") in which a document is assigned a security policy and registered, by use of the image processing apparatus 20; and a process (hereinafter, referred to as "document operation process") in which a protected document is operated by use of the terminal device 30 within a range permitted under the security policy. Hereinafter, each of these operations will be described.

<Stamp Registration Process>

First, a user puts a paper document with a stamp intended to register on the platen of the image processing apparatus 20, and starts the stamp registration function.

Here, a stamped paper document will be described.

Figure 10:
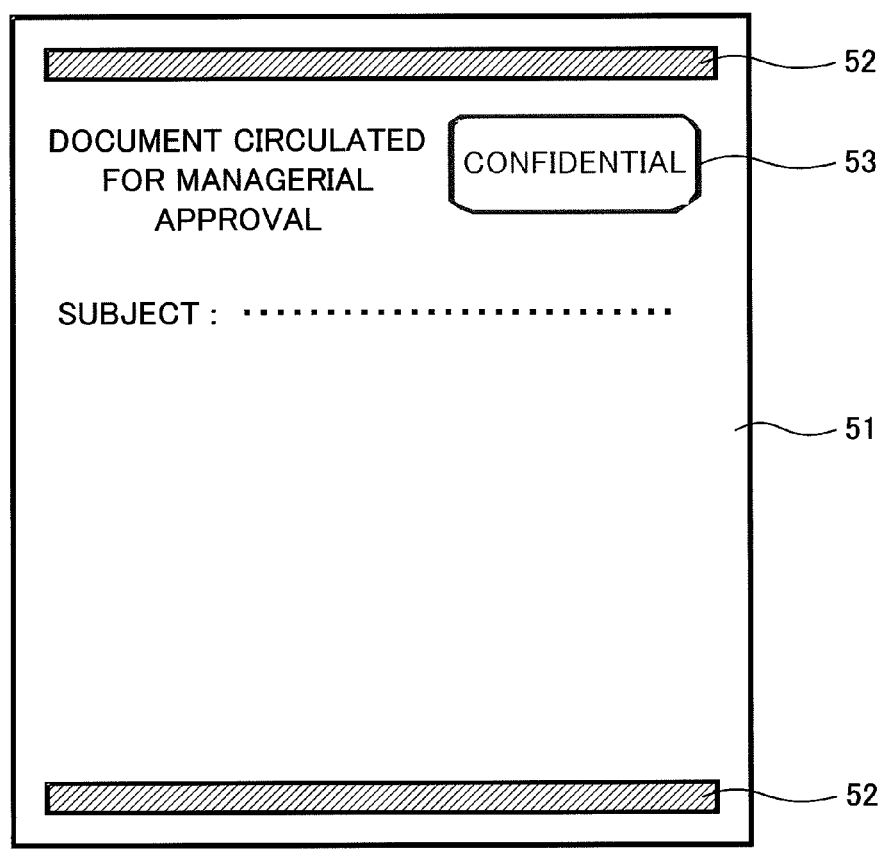
FIG. 10 is a diagram showing an example of a stamped paper document used in the exemplary embodiment.

FIG. 10 shows a stamped paper document 51.

In this paper document, a document image entitled "Document circulated for managerial approval" is printed on the whole paper. In document ID regions 52 near upper and lower edges, a document ID is embedded. The document ID herein may be embedded by printing a character string, a bar code or the like. Also, the document ID may be embedded on the whole paper as a background image, instead of being embedded at a specific position of the paper as in the case of FIG. 10. Also, another existing technique that is able to embed and read out an ID may be employed. Furthermore, this paper document has a stamp of "Confidential" in a stamp region 53.

Incidentally, in the present exemplary embodiment, a user is supposed to know how to handle a paper document to be read in this stamp registration process. The paper document is caused to be read, thereby to assign the stamp the same handling as the paper document. In other words, the assignment of a security policy to a new stamp is performed not by a method where a user selects one among a number of complicated security policies, but by use of the security policy of the paper document that the user knows.

Figure 11:
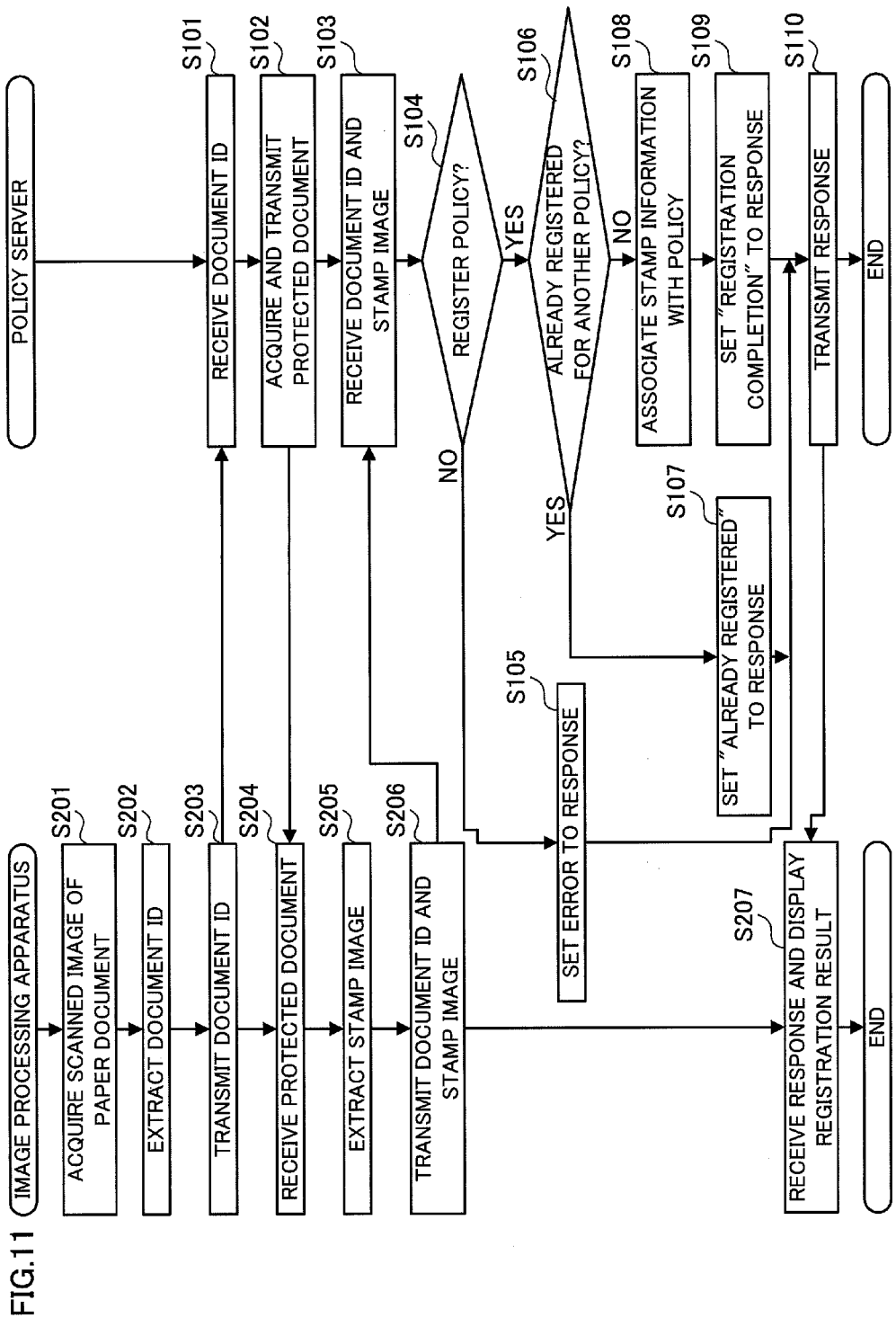
FIG. 11 is a sequence diagram showing an operation example of the computer system when a stamp is registered.

FIG. 11 is a sequence diagram showing information exchange between the image processing apparatus 20 and the policy server 10 when the stamp registration process is started.

In the image processing apparatus 20, when the stamp registration process is started, the image capturing unit 20g scans a stamped paper document. The scanned image acquisition unit 21 acquires the scanned image obtained by scanning, and passes the scanned image to the document ID extraction unit 22 and the stamp extraction unit 23 (Step 201). The document ID extraction unit 22 then searches out a position at which a document ID is embedded, from this scanned image, extracts the document ID and passes the document ID to the stamp extraction unit 23 and the stamp registration unit 24 (Step 202).

Next, the stamp extraction unit 23 specifies the document ID passed from the document ID extraction unit 22, thereby to call the document retrieval unit 14 of the policy server 10 (Step 203).

Then, in the policy server 10, the document retrieval unit 14 receives the document ID (Step 101).

The document retrieval unit 14 then acquires the document data (protected document) identified by the specified document ID from the document information DB 13, and transmits the document data to the image processing apparatus 20 (Step 102).

Thereby, in the image processing apparatus 20, the stamp extraction unit 23 receives the protected document (Step 204). The stamp extraction unit 23 then extracts a stamp image by taking the difference between the scanned image passed in Step 201 and the protected document received here and passed the stamp image to the stamp registration unit 24 (Step 205).

Thereafter, the stamp registration unit 24 specifies the document ID passed in Step 202 and the stamp image passed in Step 205, thereby to call the stamp registration unit 18 of the policy server 10 (Step 206).

Then, in the policy server 10, the stamp registration unit 18 receives the document ID and the stamp image (Step 103).

The stamp registration unit 18 then refers to the document information DB 13 to determine whether a policy ID is associated with the specified document ID (Step 104).

Then, if the stamp registration unit 18 determines that no policy ID is associated with the document ID, the stamp registration unit 18 sets an error "No security policy is assigned to the target document." to the response (Step 105).

Also, if the stamp registration unit 18 determines that a policy ID is associated with the document ID, the stamp registration unit 18 determines whether the specified stamp image is registered with the assignment of a policy ID other than this policy ID (Step 106). Specifically, the stamp character data of the specified stamp image is first calculated. The record of the specified policy ID is then retrieved from the policy DB 12. Next, the stamp DB 11 is checked whether a stamp having stamp character data which coincides with the calculated stamp character data is registered except for the stamp of the stamp ID defined in this record.

As a result, if the stamp registration unit 18 determines that such a stamp has already been registered, the stamp registration unit 18 sets an error "The target stamp has already been registered." to the response (Step 107).

On the other hand, if the stamp registration unit 18 determines that such a stamp has not been registered, the stamp registration unit 18 registers the stamp information concerning the specified stamp, in association with the specified policy ID (Step 108). Specifically, the stamp character data of the specified stamp image is first calculated. The newly generated stamp ID, the specified stamp image and the stamp character data obtained by the calculation are then registered in the stamp DB 11. Next, the newly generated stamp ID is added as the stamp ID of the record having the specified policy ID.

Then, the stamp registration unit 18 set, to the response, a notification that the assignment of a security policy to the stamp image has been completed (Step 109).

Thereafter, the stamp registration unit 18 returns the response to the image processing apparatus 20 (Step 110).

Thereby, in the image processing apparatus 20, the stamp registration unit 24 receives the result of the stamp registration process, and causes the operation panel 20*f* to display the result (Step 207).

In Step 202 of this operation example, the document ID extraction unit 22 passes the document ID not only to the stamp registration unit 24 but also the stamp extraction unit 23. The document ID extraction unit 22 may, however, pass the document ID only to the stamp registration unit 24, and then the stamp registration unit 24 may pass the document ID to the stamp extraction unit 23.

Also, in this operation example, the stamp image extracted in Step 205 is sent to the stamp registration unit 18 of the policy server 10 as it is. However, modification (such as removal of a certain range or garbage, complement of a pixel defect, or the like) made by a user on the stamp image to be registered may be received from the operation panel 20*f*. In this case, existing image processing may be used as a process modifying a stamp image.

Here, a method to extract a stamp image in Step 205 of FIG. 11 will be described.

FIG. 12 is a diagram showing an extraction method of a stamp image in the concrete.

In FIG. 12, document data 54 is document data generated by reading a stamped paper document, while document data 55 is document data registered in the document information DB 13 and having no stamp image. Differential document data 56 is obtained by taking the difference between these data. Moreover, stamp image data 57 is obtained by taking out a part where a pixel exists from the differential document data 56.

Note that the above extraction method is not limited to a method where difference is taken so as to associate the pixels located at the same position in the document data 54 and the document data 55 with each other. The following method may be employed: differences are taken so as to associate the pixels of the document data 54 with those of the document data 55 while these document data are rotated or shifted with respect to each other in the vertical or lateral direction; and then the minimum of the differences is made the definitive difference.

There may be included a process to remove noise by use of an existing technique, such as taking account of only a difference in which a number of adjacent pixels is not less than a predetermined value when the differences are taken.

Furthermore, if the read document data 54 and the registered document data 55 have different forms from each other, the differences may be taken after the conversion of both data into those having comparable forms. For example, if the document data 54 and the document data 55 have different sizes, it is conceivable that the size of the document data 55 may be converted on the basis of the size of the document data 54, when or after the document data 55 is taken out from the document information DB 13.

Although the registered document data 55 includes a document ID in FIG. 12, the document ID may not be included. In this case, there may be performed a process to exclude the part of a document ID from the comparison object, a process in which the document data 55 with the document ID superposed is set the comparison object, and the like, when the differences are taken.

Next, a description will be given of how performing the operation shown in FIG. 11 updates the stamp DB 11 of FIG. 4 and the policy DB 12 of FIG. 5.

FIGS. 13A and 13B are tables showing information stored in these databases after update. Here is considered a case in which a stamp "Confidential" is made on the paper document of the document ID "0001" shown in FIG. 6, and this document is read.

Suppose that the stamp ID "0002" is assigned to the stamp "Confidential." In this case, a record concerning the stamp "Confidential" is then added in the stamp DB 11 in association with the stamp ID "0002," as shown in FIG. 13A.

With reference to FIG. 6, the paper document of the document ID "0001" read in this example is assigned the security policy of the policy ID "0001." The stamp ID "0002" is thus registered to the record of the policy ID "0001" in the policy DB 12, as shown in FIG. 13B.

In the above description, association between a stamp ID and a policy ID is made by storing the stamp ID in the policy DB 12, as shown in FIGS. 4 and 5. The association may, however, be made by storing the policy ID in the stamp DB 11.

FIGS. 14A and 14B show an example of the stamp information stored in the stamp DB 11 and the policy information stored in the policy DB 12 of this case, respectively.

The policy ID is added in the stamp DB 11 as shown in FIG. 14A, while the stamp ID is removed from the policy DB 12 as shown in FIG. 14B. This is a configuration to facilitate an application into an existing document management system using no stamps.

For this case also, a description will be given of how performing the operation shown in FIG. 11 updates the stamp DB 11 and the policy DB 12 of FIGS. 14A and 14B.

FIG. 15 is a table showing information stored in the stamp DB 11 after update. Here is also considered the case in which a stamp "Confidential" is made on the paper document of the document ID "0001" shown in FIG. 6, and this document is read.

Suppose that the stamp ID "0002" is assigned to the stamp "Confidential." In this case, a record concerning the stamp "Confidential" is then added in the stamp DB 11 in association with the stamp ID "0002."

With reference to FIG. 6, the paper document of the document ID "0001" read in this example is assigned the security policy of the policy ID "0001." The policy ID "0001" is also registered to the added record in the stamp DB 11.

On the other hand, the policy DB 12 is not updated.

That is, this configuration only needs to update the stamp DB 11 on the occasion of the stamp registration.

In the above description, association between a document ID and a policy ID is made by storing the policy ID in the document information DB 13, as shown in FIGS. 5 and 6. The association may, however, be made by storing the document ID in the policy DB 12. In this case, the policy ID corresponding to a document ID is directly taken out of the policy DB 12.

However, in the following operation example, a description will be given on the assumption of the stamp DB 11 of FIG. 4, the policy DB 12 of FIG. 5 and the document information DB 13 of FIG. 6, again.

<Document Registration Process>

First, a user puts a stamped paper document on the platen of the image processing apparatus 20, and starts the document registration function.

Here, although the stamped paper document is the same as that shown in FIG. 10, no document ID is supposed to be embedded.

Figure 16:
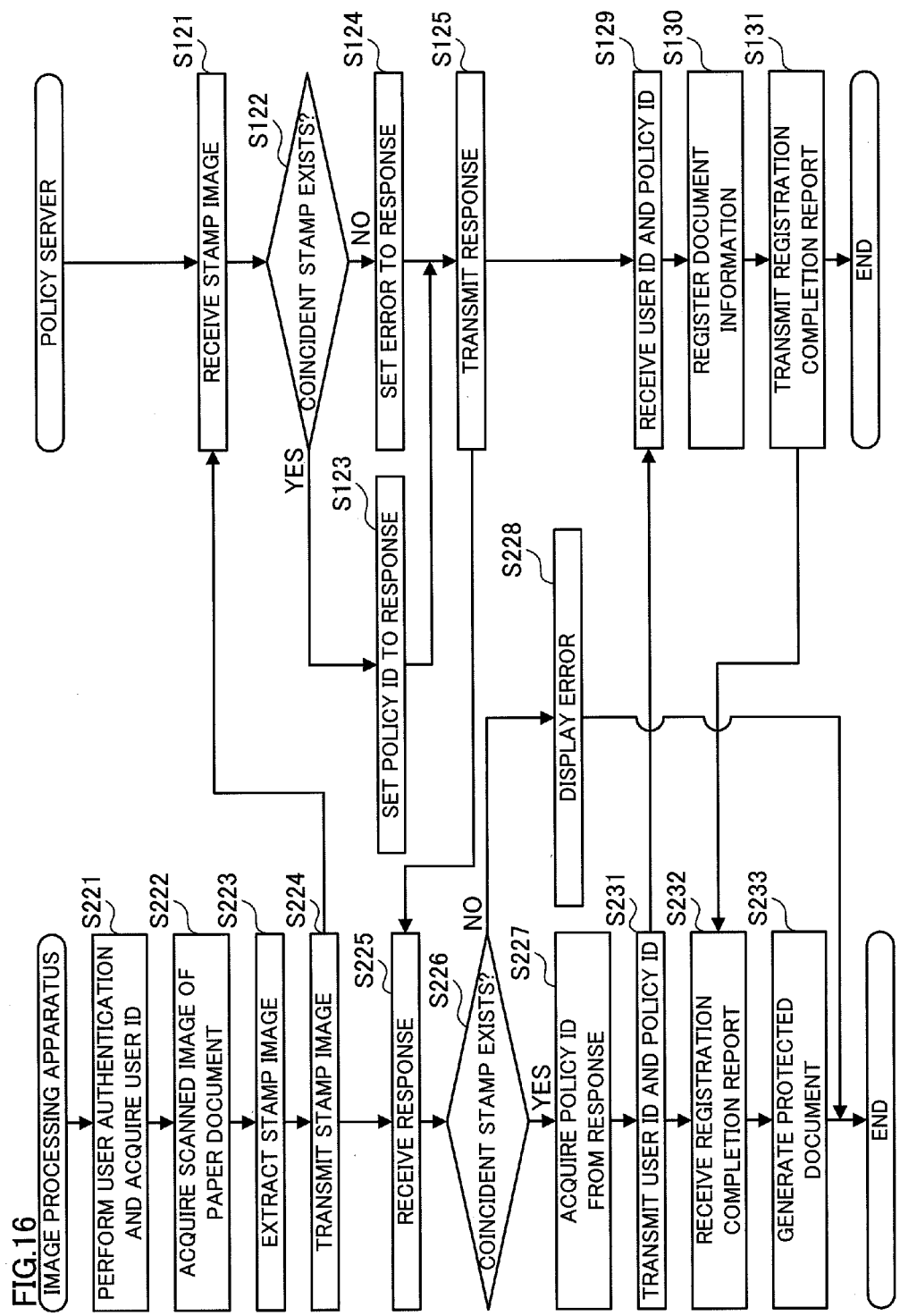
FIG. 16 is a sequence diagram showing an operation example of the computer system when a document is registered.

FIG. 16 is a sequence diagram showing information exchange between the image processing apparatus 20 and the policy server 10 when the document registration process is started.

In the image processing apparatus 20, when the document registration process is started, the user authentication unit 25 first performs user authentication and holds a user ID if the user authentication is succeeded (Step 221). Specifically, the user authentication unit 25 prompts the user to input the user ID and the password, and inquires to the authentication server 40 to confirm whether the combination of the user ID and the password is valid. If the user authentication is succeeded, the user authentication unit 25 passes the user ID to the document registration unit 28. If not, the process is interrupted, although not shown.

Next, the image capturing unit 20g scans the stamped paper document. The scanned image acquisition unit 21 acquires the scanned image obtained by scanning, and passes the scanned image to the stamp extraction unit 23 (Step 222). The stamp extraction unit 23 then searches out, from this scanned image, a position at which the stamp is made, generates a stamp image and passes the stamp image to the stamp discrimination unit 26 (Step 223). On this occasion, the scanned image from which the stamp image is removed is once stored in the memory as electronic document data.

Thereafter, the stamp discrimination unit 26 specifies the passed stamp image to call the stamp discrimination unit 16 of the policy server 10 (Step 224).

Then, in the policy server 10, the stamp discrimination unit 16 receives the specified stamp image (Step 121).

The stamp discrimination unit 16 then determines whether a stamp having a stamp image which coincides with the specified stamp image is registered (Step 122). Specifically, the stamp character data of the specified stamp image is first calculated. The stamp discrimination unit 16 then refers to the stamp DB 11 to determine whether a stamp having stamp character data which coincides with the stamp character data is registered. However, since an actual stamp image has a faint part and the like, complete coincidence of the stamp character data is unlikely. Therefore, the stamp discrimination unit 16 herein determines as "coincident" if the difference between the stamp character data of the registered stamp image and that of the specified stamp image is not more than an extremely small threshold value.

As a result, if a coincident stamp is registered, the stamp discrimination unit 16 retrieves the policy ID corresponding to the registered stamp ID from the policy DB 12, and sets the policy ID to the response (Step 123).

On the other hand, if a coincident stamp is not registered, the stamp discrimination unit 16 sets an error "No coincident stamp exists." to the response (Step 124).

Thereafter, the stamp discrimination unit 16 returns the response to the image processing apparatus 20 (Step 125).

Thereby, in the image processing apparatus 20, the stamp discrimination unit 26 receives the response from the policy server 10 (Step 225).

The stamp discrimination unit 26 then determines whether the contents of the response indicate that a coincident stamp image exists in the policy server 10 (Step 226). Specifically, the stamp discrimination unit 26 determines which of a policy ID and an error is set to the response.

As a result, if it is determined that the response indicates the existence of a coincident stamp image, namely, if it is determined that a policy ID is set to the response, the stamp discrimination unit 26 takes the policy ID out of the response, and passes the policy ID to the document registration unit 28 (Step 227).

Thereafter, the document registration unit 28 specifies the user ID passed in Step 221 and the policy ID passed in Step 227, thereby to call the document registration unit 19 of the policy server 10 (Step 231).

Then, in the policy server 10, the document registration unit 19 receives the specified user ID and the policy ID (Step 129). The document registration unit 19 then retrieves the security policy of the specified policy ID from the policy DB 12, and registers, in the document information DB 13, the document information of the document data generated by scanning of this time (Step 130). Specifically, the document registration unit 19 registers the newly generated document ID, the policy ID and the user ID in the document information DB 13. The user ID is registered as the creator ID in the document information DB 13.

Thereafter, the document registration unit 19 transmits a registration completion report including the document ID to the image processing apparatus 20 (Step 131).

Thereby, in the image processing apparatus 20, the document registration unit 28 receives the registration completion report, and specifies the document ID to call the document protection process unit 29 (Step 232).

The document protection process unit 29 then encrypts the document data body once stored in the memory in Step 223, and embeds the document ID into the document data to generate a protected document (Step 233). The protected document is uploaded to the policy server 10, for example, and is managed in association with the document ID of the protected document in the document information DB 13. The result of generation of the protected document is displayed on the operation panel 20ƒ.

If it is determined that the response indicates the nonexistence of a coincident stamp image in Step 226, namely, if it is determined that an error is set to the response, the stamp discrimination unit 26 causes the operation panel 20ƒ to display an error message (Step 228).

<Document Operation Process>

Various operations, such as browsing, editing, storing, printing, executing a macro, retrieving, text copying and the like, are conceivable as operations for a protected document. However, browsing and editing will be described herein as typical operations. Other operations may be performed similarly if each operation is made an object of the right in the policy DB 12.

First, browsing a protected document will be described.

Figure 17:
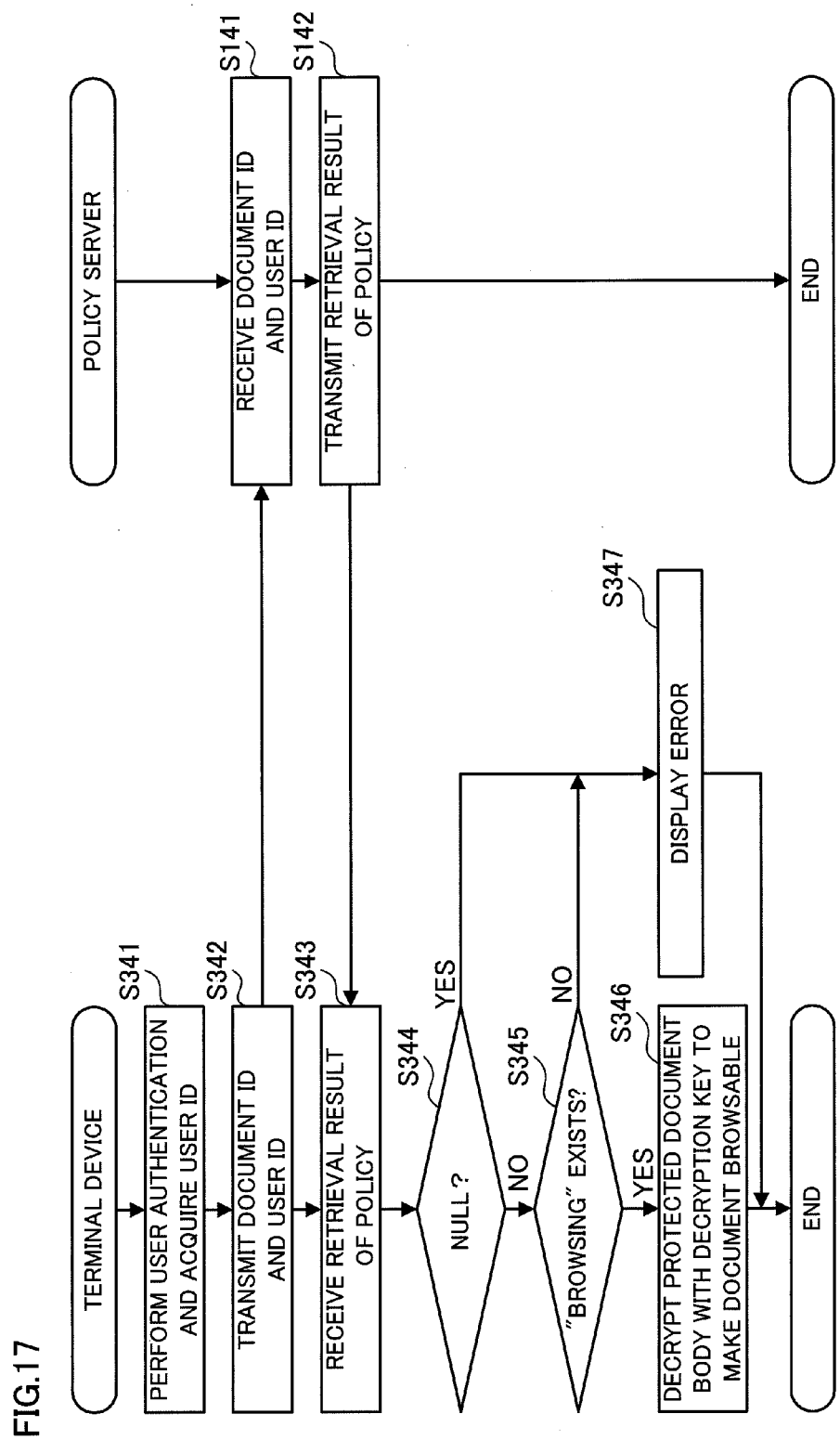
FIG. 17 is a sequence diagram showing an operation example of the computer system when a document is browsed.

FIG. 17 is a sequence diagram showing information exchange between the terminal device 30 and the policy server 10 when a user browses a protected document. This sequence is started if a user starts a document processing AP with the protected document specified.

When the document processing AP is started, in the terminal device 30, the user authentication unit 31 first performs user authentication and holds a user ID if the user authentication is succeeded (Step 341). Specifically, the user authentication unit 31 prompts the user to input the user ID and the password, and inquires to the authentication server 40 to confirm whether the combination of the user ID and the password is valid. If the user authentication is succeeded, the user authentication unit 31 passes the user ID to the protected document operation unit 32. If not, the process is interrupted, although not shown.

Next, the protected document operation unit 32 acquires the protected document to read the document ID therefrom, and acquires the user ID from the user authentication unit 31. The protected document operation unit 32 calls the document retrieval unit 14 of the policy server 10 with the document ID and the user ID as parameters (Step 342).

Then, in the policy server 10, the document retrieval unit 14 receives the document ID and the user ID (Step 141).

The document retrieval unit 14 then retrieves the record of the specified document ID from the document information DB 13, and returns the retrieval result to the terminal device 30 (Step 142). Specifically, the document retrieval unit 14 retrieves the record of the specified document ID from the document information DB 13, and acquires the policy ID included in the record. Next, the document retrieval unit 14 retrieves the record of the policy ID from the policy DB 12, and extracts the right if the specified user is included in the range of disclosure and the present is in the due time. The document retrieval unit 14 returns the extracted result if the right is extracted, while the document retrieval unit 14 returns NULL if not.

Thereby, in the terminal device 30, the protected document operation unit 32 receives the retrieval result from the policy server 10 (Step 343), and determines whether the retrieval result is NULL (Step 344).

As a result, if the retrieval result is NULL, the user is not permitted to operate the specified protected document. The protected document operation unit 32 thus causes the display mechanism 30g to display an error message like "You do not have an access right to the specified document." (Step 347), and finishes the operation.

On the other hand, if the retrieval result is not NULL, the protected document operation unit 32 refers to the items of the right included in the retrieval result to determine whether "browsing" is included therein (Step 345). If "browsing" is not included, the protected document operation unit 32 causes the display mechanism 30g to display an error message like "You do not have a browse right to the specified document." (Step 347), and finishes the operation. If "browsing" is included, the user is determined to have a browse right. The protected document operation unit 32 thus decrypts the document body with a predetermined decryption key, and causes the display mechanism 30g to display the document, thereby to make the document browsable for the user (Step 346).

Next, editing a protected document will be described.

FIG. 18 is a sequence diagram showing information exchange between the terminal device 30 and the policy server 10 when a user edits a protected document. On the occasion of editing, it is supposed that the protected document has already been opened by the document processing AP. That is, the following sequence is started in a state where the operation on the occasion of browsing shown in FIG. 17 has been performed and the protected document has already been read.

In the terminal device 30, upon a request of document editing by a user, the protected document operation unit 32 calls the document retrieval unit 14 of the policy server 10 with the document ID of the protected document and the user ID as parameters (Step 362).

Then, in the policy server 10, the document retrieval unit 14 receives the document ID and the user ID (Step 161).

The document retrieval unit 14 then retrieves the record of the specified document ID from the document information DB 13, and returns the retrieval result to the terminal device 30 (Step 162). Specifically, the document retrieval unit 14 retrieves the record of the specified document ID from the document information DB 13, and acquires the policy ID included in the record. Next, the document retrieval unit 14 retrieves the record of the policy ID from the policy DB 12, and extracts the right if the specified user is included in the range of disclosure and the present is in the due time. The document retrieval unit 14 returns the extracted result if the right is extracted, while the document retrieval unit 14 returns NULL if not.

Thereby, in the terminal device 30, the protected document operation unit 32 receives the retrieval result from the policy server 10 (Step 363), and determines whether the retrieval result is NULL (Step 364).

As a result, if the retrieval result is NULL, the user is not permitted to operate the specified protected document. The protected document operation unit 32 thus causes the display mechanism 30g to display an error message like "You do not have an access right to the specified document." (Step 367), and finishes the operation.

On the other hand, if the retrieval result is not NULL, the protected document operation unit 32 refers to the items of the right included in the retrieval result to determine whether "editing" is included therein (Step 365). If "editing" is not included, the protected document operation unit 32 causes the display mechanism 30g to display an error message like "You do not have an edit right to the specified document." (Step 367), and finishes the operation. If "editing" is included, the user is determined to have an edit right. The protected document operation unit 32 thus permits document editing by the user, and causes the user to edit the document (Step 366).

The retrieval result of the policy may be held when the operation on the occasion of browsing shown in FIG. 17 is performed, and thus the protected document operation unit 32 may determine whether "editing" is included in the held retrieval result.

The description of the operations of the present exemplary embodiment is now finished.

Although the policy server 10 manages the stamp DB 11, the policy DB 12 and the document information DB 13 in the present exemplary embodiment, the configuration is not limited to this case. For example, all or a part of these databases may be managed by another server computer. It is also conceivable that all or a part of these databases may be managed by the image processing apparatus 20. If such a configuration is employed, the image processing apparatus 20 will include the document retrieval unit 14, the stamp discrimination unit 16, the stamp registration unit 18 and the document registration unit 19, which are provided in the policy server 10 in the above description. In this case, then, the stamp extraction unit 23 is an example of the associated image acquisition unit that acquires an associated image, while the stamp registration unit 24 (which includes the function of the stamp registration unit 18 provided in the policy server 10 in the above description) is an example of the registration unit that registers the associated image with the associated image being assigned to a process.

Although in the description of the present exemplary embodiment, the process to assign a security policy to a document image has been exemplified as a process for a document image read from a medium, the process is not limited to this one. For document data generated from a document image read from a medium, there may be various types of processes, such as a process to send the data to different facsimile numbers, a process to send the data to different e-mail addresses, a process to store the data in different folders of an external document management system and a process to pass the data to different workflows, according to the result of recognition of a stamp.

Furthermore, although in the present exemplary embodiment, a stamp image, which is an example of an imprint image, has been exemplified as an associated image that is associated with a document image read from a medium, the associated image may be an image printed with a printer. Also, the associated image may be provided apart from a document image, instead of a case where an image obtained by superimposing the associated image on a document image is read to extract the associated image therefrom.

Although a document image is supposed to be printed on a medium in the description, it does not indicate only an image of "a document" including a text. The "document image" includes, for example, an image such as pictures, photographs and figures, an image generated by a database management software or a spread sheet software, and other printable images.

Furthermore, the material of a medium on which a document image is to be printed is not limited to any particular one, as long as an image is printable on the medium. The material, which is typically paper, may be wood, cloth or the like.

Note that the program to implement the present exemplary embodiment may be provided not only by a communication unit but also by being stored in a memory medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image registration device comprising:
   a scanner that acquires a document image that is scanned from a medium on which the document image is formed; and
   at least one processor which executes:
      a document ID extraction unit that extracts a document ID from the acquired document image and provides the extracted document ID to a security policy server;
      a stamp image extraction unit that extracts a stamp image associated with the acquired document image; and
      a stamp registration unit that, in response to a notification from the security policy server that a security policy has been assigned to the extracted document ID and that the extracted stamp image has not been registered in the security policy server, registers the extracted stamp image as being assigned to the security policy.

2. The image registration device according to claim 1, wherein the stamp extraction unit receives a protected document that is transmitted from the security policy server in response to receiving the extracted document ID,
   wherein the protected document is identified by the extracted document ID, and
   wherein the stamp extraction unit compares the received protected document to the acquired document image to thereby extract the stamp image.

3. The image registration device according to claim 1, wherein the stamp registration unit receives the notification from the security policy server only after the security policy server first confirms whether or not the extracted stamp image has already been registered as being assigned to a security policy.

4. The image registration device according to claim 1, wherein the security policy server determines whether or not the document ID has been registered in the security policy server.

5. The image registration device according to claim 1, wherein the security policy server determines whether or not the extracted stamp image has been registered in the security policy server.

6. The image registration device according to claim 1, wherein the stamp registration unit, in response to the notification from the security policy server that a security policy has been assigned to the extracted document ID and that the extracted stamp image has not been registered in the security policy server, registers a newly generated stamp ID as being assigned to the extracted stamp image.

7. The image registration device according to claim 1, wherein the stamp image comprises at least one character.

8. The image registration device according to claim 1, wherein the stamp image is not printed on the medium.

9. The image registration device according to claim 1, wherein the stamp image is added onto the medium by a user.

10. An image registration device comprising:
a scanner that acquires an image from a medium on which the image is formed, the image including a document image and a stamp image associated with the document image;
at least one processor that executes:
a stamp image extraction unit that extracts the stamp image from the acquired image; and
a registration unit;
wherein the image registration device provides the extracted stamp image to a stamp discrimination unit of a security policy server,
wherein the image registration device receives from the security policy server, in response to the security policy server determining that the extracted stamp image has been registered in the security policy server, a policy ID assigned to the extracted stamp image, the policy ID identifying a security policy, and
wherein the registration unit registers the document image as being assigned to the policy ID assigned to the extracted stamp image.

11. An image registration method comprising:
acquiring a document image that is scanned from a medium on which the document image is formed;
extracting a document ID from the acquired document image;
providing the extracted document ID to a security policy server;
extracting a stamp image associated with the acquired document image;
providing a notification from the security policy server that a security policy has been assigned to the extracted document ID and that he extracted stamp image has not been registered in the security policy server; and
in response to the notification, registering the extracted stamp image as being assigned to the security policy.

12. A non-transitory computer readable medium storing a program that causes a computer to execute a process for image registration, the process comprising:
acquiring a document image that is scanned from a medium on which the document image is formed;
extracting a document ID from the acquired document image;
providing the extracted document ID to a security policy server;
extracting a stamp image associated with the acquired document image;
providing a notification from the security policy server that a security policy has been assigned to the extracted document ID and that the extracted stamp image has not been registered in the security policy server; and
in response to the notification, registering the extracted stamp image as being assigned to the security policy.

13. An image registration system comprising:
an image processing apparatus; and
a security policy server,
wherein the image processing apparatus comprises:
a scanner that acquires a document image that is scanned from a medium on which the document image is formed; and
at least one processor which executes:
a document ID extraction unit that extracts a document ID from the acquired document image and provides the extracted document ID to a security policy server;
a stamp image extraction unit that extracts a stamp image associated with the acquired document image; and
a stamp registration unit,
wherein the security policy server provides a notification to the stamp registration unit that a security policy has been assigned to the extracted document ID and that the extracted stamp image has not been registered in the security policy server, and
wherein the stamp registration unit is configured to, in response to the notification from the security policy server, register the extracted stamp image as being assigned to the security policy.

14. An image registration system comprising:
an image processing apparatus; and
a security policy server comprising at least one processor that executes a stamp discrimination unit,
wherein the image processing apparatus comprises:
a scanner that acquires an image from a medium on which the image is formed, the image including a document image and a stamp image associated with the document image, is formed; and
at least one processor that executes:
a stamp image extraction unit that extracts the stamp image from the acquired image; and
a registration unit,
wherein the image processing apparatus provides the extracted stamp image to the stamp discrimination unit,
wherein the stamp discrimination unit determines that the extracted stamp image has been registered in the security policy server and retrieves a policy ID assigned to the extracted stamp image, the policy ID identifying a security policy,
wherein the image processing apparatus receives the policy ID from the security policy server, and
wherein the registration unit registers the document image as being assigned to the policy ID assigned to the extracted stamp image.

15. An image registration method comprising:
acquiring an image that is scanned from a medium on which the image is formed, the image including a document image and a stamp image associated with the document image, is formed;
extracting the stamp image from the acquired image;
providing the extracted stamp image to a stamp discrimination unit of a security policy server;
receiving, from the security policy server, in response to the security policy server determining that the extracted stamp image has been registered in the security policy server, a policy ID assigned to the extracted stamp image, the policy ID identifying a security policy; and
registering the document image as being assigned to the policy ID assigned to the extracted stamp image.

16. A non-transitory computer readable medium storing a program that causes a computer to execute a process for image registration, the process comprising:
acquiring an image that is scanned from a medium on which the image is formed, the image including a document image and a stamp image associated with the document image, is formed;
extracting the stamp image from the acquired image;
providing the extracted stamp image to a stamp discrimination unit of a security policy server;
receiving, from the security policy server, in response to the security policy server determining that the extracted stamp image has been registered in the security policy server, a policy ID assigned to the extracted stamp image, the policy ID identifying a security policy; and registering the document image as being assigned to the policy ID assigned to the extracted stamp image.

* * * * *